United States Patent
Sasaki

(10) Patent No.: US 11,553,093 B2
(45) Date of Patent: Jan. 10, 2023

(54) DETECTION DEVICE AND PROCESSING DEVICE

(71) Applicant: SEIKO EPSON CORPORATION, Tokyo (JP)

(72) Inventor: Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 17/161,821

(22) Filed: Jan. 29, 2021

(65) Prior Publication Data

US 2021/0243310 A1    Aug. 5, 2021

(30) Foreign Application Priority Data

Jan. 31, 2020   (JP) .............................. JP2020-014625

(51) Int. Cl.
| | |
|---|---|
| *H04N 1/00* | (2006.01) |
| *B41J 2/01* | (2006.01) |
| *G06K 9/00* | (2022.01) |
| *G06V 40/13* | (2022.01) |

(52) U.S. Cl.
CPC ............ *H04N 1/00034* (2013.01); *B41J 2/01* (2013.01); *G06V 40/1306* (2022.01); *H04N 1/00* (2013.01)

(58) Field of Classification Search
CPC .. H04N 1/00034; H04N 1/00; G06V 40/1306; B41J 2/01
USPC ......................................................... 324/686
See application file for complete search history.

(56) References Cited

U.S. PATENT DOCUMENTS

2020/0004178 A1*   1/2020  Yamamoto ........... G03G 21/203

FOREIGN PATENT DOCUMENTS

| JP | H08-054264 A | 2/1996 |
| JP | H08-082597 A | 3/1996 |
| JP | 2002-214039 A | 7/2002 |
| JP | 2017-181060 A | 10/2017 |
| JP | 2018-018023 A | 2/2018 |
| JP | 2018-044929 A | 3/2018 |

* cited by examiner

*Primary Examiner* — Allen H Nguyen
(74) *Attorney, Agent, or Firm* — Workman Nydegger

(57) ABSTRACT

A detection device includes an electrostatic capacitance sensor including an electrode pair and being configured to detect electrostatic capacitance of a medium brought into contact with the electrode pair, and a first ultrasonic wave sensor including a first transmission unit configured to transmit an ultrasonic wave and a first reception unit configured to receive an ultrasonic wave transmitted from the first transmission unit. The transmission unit and the reception unit are positioned to sandwich the medium.

6 Claims, 7 Drawing Sheets

DETECTION DEVICE AND PROCESSING DEVICE

The present application is based on, and claims priority from JP Application Serial Number 2020-014625, filed Jan. 31, 2020, the disclosure of which is hereby incorporated by reference herein in its entirety.

BACKGROUND

1. Technical Field

The disclosure relates to a detection device and a processing device.

2. Related Art

As one example of a processing device that subjects a medium to processing, JP-A-2017-181060 describes an image formation device that subjects a medium to printing. The image formation device includes a sensor that detects surface roughness of the medium. The image formation device differentiates glossiness of the medium, based on the surface roughness of the medium detected by the sensor. The image formation device differentiates types of the medium, based on the glossiness of the medium. The image formation device subjects the medium to printing in accordance with its type by differentiating the types of the medium.

Surface roughness of media may differ in some cases even in a case of media of the same type. Regardless of surface roughness of media, characteristics may differ for each medium in a case of media of the same type. For example, even when media of the same type are subjected to the same processing, an amount of moisture contained in the media may differ for each medium. An amount of moisture contained in a medium largely affects printing quality of the medium. Thus, it has been demanded to detect an amount of moisture contained in the medium at high accuracy.

SUMMARY

In order to solve the above-mentioned problem, a detection device includes an electrostatic capacitance sensor including an electrode pair and being configured to detect electrostatic capacitance of a medium brought into contact with the electrode pair, and an ultrasonic wave sensor including a transmission unit configured to transmit an ultrasonic wave and a reception unit configured to receive an ultrasonic wave transmitted from the transmission unit, wherein the transmission unit and the reception unit are positioned to sandwich the medium.

In order to solve the above-mentioned problem, a processing device includes a first electrostatic capacitance sensor including a first electrode pair and being configured to detect electrostatic capacitance of a medium brought into contact with the first electrode pair, a second electrostatic capacitance sensor including a second electrode pair and being configured to detect electrostatic capacitance of the medium brought into contact with the second electrode pair, an ultrasonic wave sensor including a transmission unit configured to transmit an ultrasonic wave and a reception unit configured to receive an ultrasonic wave transmitted from the transmission unit, a support unit configured to support the medium to be transported, and a processing unit facing the support unit and being configured to perform processing of increasing or decreasing an amount of moisture contained in the medium, wherein the transmission unit and the reception unit are positioned to sandwich the medium to be transported, the first electrode pair is brought into contact with the medium before being subjected to processing by the processing unit, and the second electrode pair is brought into contact with the medium after being subjected to processing by the processing unit.

DESCRIPTION OF EXEMPLARY EMBODIMENTS

With reference to the drawings, a printing system including a processing device of one exemplary embodiment is described below.

First Embodiment

Figure 1:
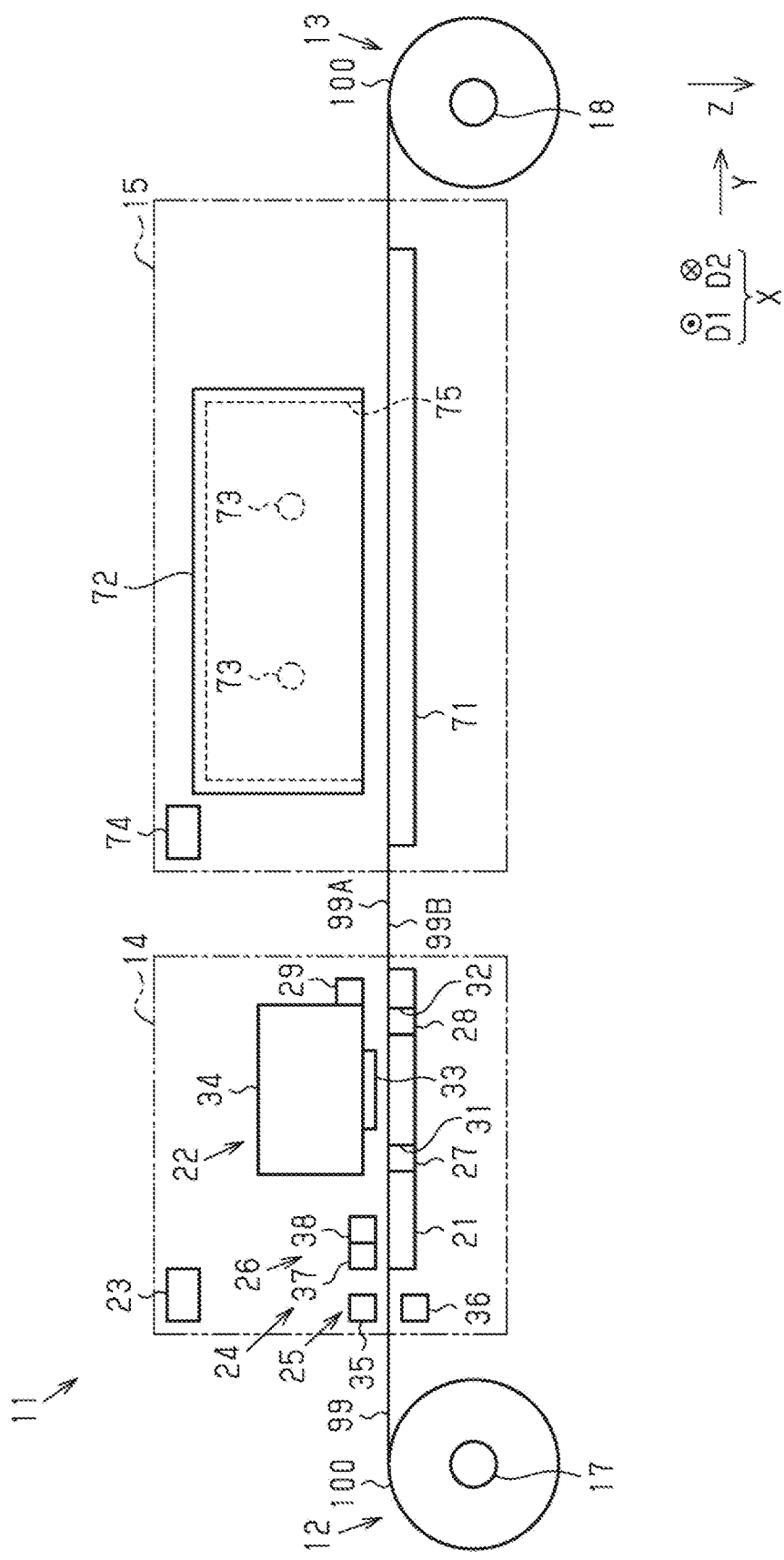
FIG. 1 is a schematic view illustrating a printing system including processing devices including a detection device of a first exemplary embodiment.

As illustrated in FIG. 1, a printing system 11 of the first exemplary embodiment includes a retaining device 12, a winding device 13, a printing device 14, and a drying device 15.

The retaining device 12 is a device that retains a roll body 100 obtained by winding a medium 99 in an overlapping manner. The retaining device 12 includes a retaining shaft 17 that retains the roll body 100. For example, the retaining shaft 17 in configured to be rotatable. The medium 99 is fed from the roll body 100 along with rotation of the retaining shaft 17. In the first exemplary embodiment, instead of actively rotating, the retaining shaft 17 is rotated together with the roll body 100, for example, while the medium 99 is pulled from the roll body 100. The medium 99 is a sheet such as a paper sheet and fabric. The retaining shaft 17 may be configured to be unrotatable. In this case, the roll body 100 is rotated with respect to the retaining shaft 17 while the medium 99 is pulled from the roll body 100.

The winding device 13 is a device that winds the medium 99 fed from the retaining device 12. The winding device 13 includes a winding shaft 18 that the medium 99. The winding shaft 18 is configured to be rotatable. The winding shaft 18 winds the medium 99 along with rotation. As a result, the winding shaft 18 retains the roll body 100 formed by winding the medium 99. In the first exemplary embodiment, while the winding shaft 18 is rotated, the medium 99 is fed from the roll body 100 retained by the retaining shaft 17.

The medium 99 is transported by being wound by the winding device 13. The medium 99 is transported from the retaining device 12 to the winding device 13. In the first exemplary embodiment, a direction from the retaining device 12 to the winding device 13 is a transport direction Y of the medium 99. The medium 99 includes a front surface 99A and a back surface 99B being a surface opposite to the front surface 99A.

The printing device 14 is a device that subjects the medium 99 to printing. For example, the printing device 14 is an ink jet-type printer that records an image such as characters, photographs, and figures, on the medium 99 by ejecting ink being one example of liquid. In the first exemplary embodiment, the printing device 14 is one example of a processing device. Specifically, the printing device 14 subjects the medium 99 to processing by subjecting the medium 99 to printing.

The printing device 14 is positioned between the retaining device 12 and the winding device 13 in the transport direction Y. More specifically, the printing device 14 is positioned between the retaining device 12 and the drying device 15 in the transport direction Y. Thus, the medium 99 fed from the retaining device 12 passes through the printing device 14 and the drying device 15 in the stated order.

The printing device 14 includes a first support unit 21, a printing unit 22, and a first control unit 23. The printing device 14 includes a detection device 24.

The detection device 24 is a device that detects an amount of moisture contained in the medium 99. The detection device 24 of the first exemplary embodiment detects an amount of moisture contained in the medium 99 supported by the first support unit 21.

The detection device 24 includes ultrasonic wave sensors and electrostatic capacitance sensors. The detection device 24 of the first exemplary embodiment includes two ultrasonic wave sensors, and may include three or more sensors or only one sensor. The detection device 24 of the first exemplary embodiment includes a first ultrasonic wave sensor 25 and a second ultrasonic wave sensor 26. The detection device 24 of the first exemplary embodiment includes two electrostatic capacitance sensors, and may include three or more sensors or only one sensor. The detection device 24 of the first exemplary embodiment includes a first electrostatic capacitance sensor 27 and a second electrostatic capacitance sensor 28. The detection device 24 further includes an optical sensor 29. A configuration of the detection device 24 is described later in detail.

For example, the first support unit 21 is a plate-like member. The first support unit 21 supports the medium 99. The first support unit 21 of the first exemplary embodiment supports the medium 99 from below. The first support unit 21 of the first exemplary embodiment is brought into contact with the back surface 99B of the medium 99. The first support unit 21 is a support unit included in the printing device 14 in the printing system 11. The first support unit 21 has attachment holes for attaching the electrostatic capacitance sensors. The first support unit 21 of the first exemplary embodiment has a first attachment hole 31 for attaching the first electrostatic capacitance sensor 27 and a second attachment hole 32 for attaching the second electrostatic capacitance sensor 28.

The printing unit 22 faces the first support unit 21. The printing unit 22 of the first exemplary embodiment is positioned above the first support unit 21. The printing unit 22 is configured to subject the medium 99 to printing. The printing unit 22 of the first exemplary embodiment includes a head 33 and a carriage 34.

The head 33 faces the first support unit 21. The head 33 of the first exemplary embodiment is positioned above the first support unit 21. The head 33 ejects liquid onto the medium 99 supported by the first support unit 21. As a result, an image is printed on the medium 99. The head 33 of the first exemplary embodiment ejects the liquid onto the front surface 99A of the medium 99. For example, the liquid ejected from the head 33 is aqueous ink composed of a water as a solvent.

When the head 33 ejects the liquid onto the medium 99, an amount of moisture contained in the medium 99 is increased. Specifically, the head 33 ejects the liquid onto the medium 99, and thus subjects the medium 99 to processing of increasing an amount of moisture contained in the medium 99. The head 33 subjects the front surface 99A of the medium 99 to processing, which is opposite to the back surface 99B with which the first support unit 21 is brought into contact. In this respect, the head 33 of the first exemplary embodiment is one example of a processing unit.

The head 33 is mounted on the carriage 34. The carriage 34 faces the first support unit 21. The carriage 34 of the first exemplary embodiment is positioned above the first support unit 21. The carriage 34 scans the transported medium 99. Specifically, the carriage 34 reciprocates along the width of the medium 99 above the first support unit 21. In this case, the carriage 34 reciprocates in a scanning direction X.

The scanning direction X indicates both directions including a first direction D1 and the second direction D2. The first direction D1 is a direction opposite to the second direction D2. The first direction D1 and the second direction D2 are directions different from the transport direction Y and a vertical direction Z.

The printing device 14 of the first exemplary embodiment is a serial printer in which the head 33 scans the medium 99. The printing device 14 may be a line printer in which the head 33 ejects the liquid all at once along the width of the medium 99.

The first control unit 23 controls the various configurations of the printing device 14. For example, the first control unit 23 controls the printing unit 22. The first control unit 23 is a control unit included in the printing device 14 in the printing system 11.

The first control unit 23 of the first exemplary embodiment is communicable with the retaining device 12, the winding device 13, and the drying device 15. As required, the first control unit 23 receives a signal from the retaining device 12, the winding device 13, and the drying device 15, and transmits a signal to the retaining device 12, the winding device 13, and the drying device 15. The first control unit 23 may integrally control the printing system 11.

The first control unit 23 may be configured as α: one or more processors that executes various processing in accordance with computer programs, β: one or more special purpose hardware circuit such as a special purpose integrated circuit, which executes at least part of processing of the various processing, or γ: a circuit including a combination of those. The processor includes a CPU and a memory such as a RAM and a ROM, and the memory stores program codes or commands configured to cause the CPU to execute processing. The memory, or a computer readable medium includes any readable medium accessible by a general purpose or special purpose computer.

Figure 2:
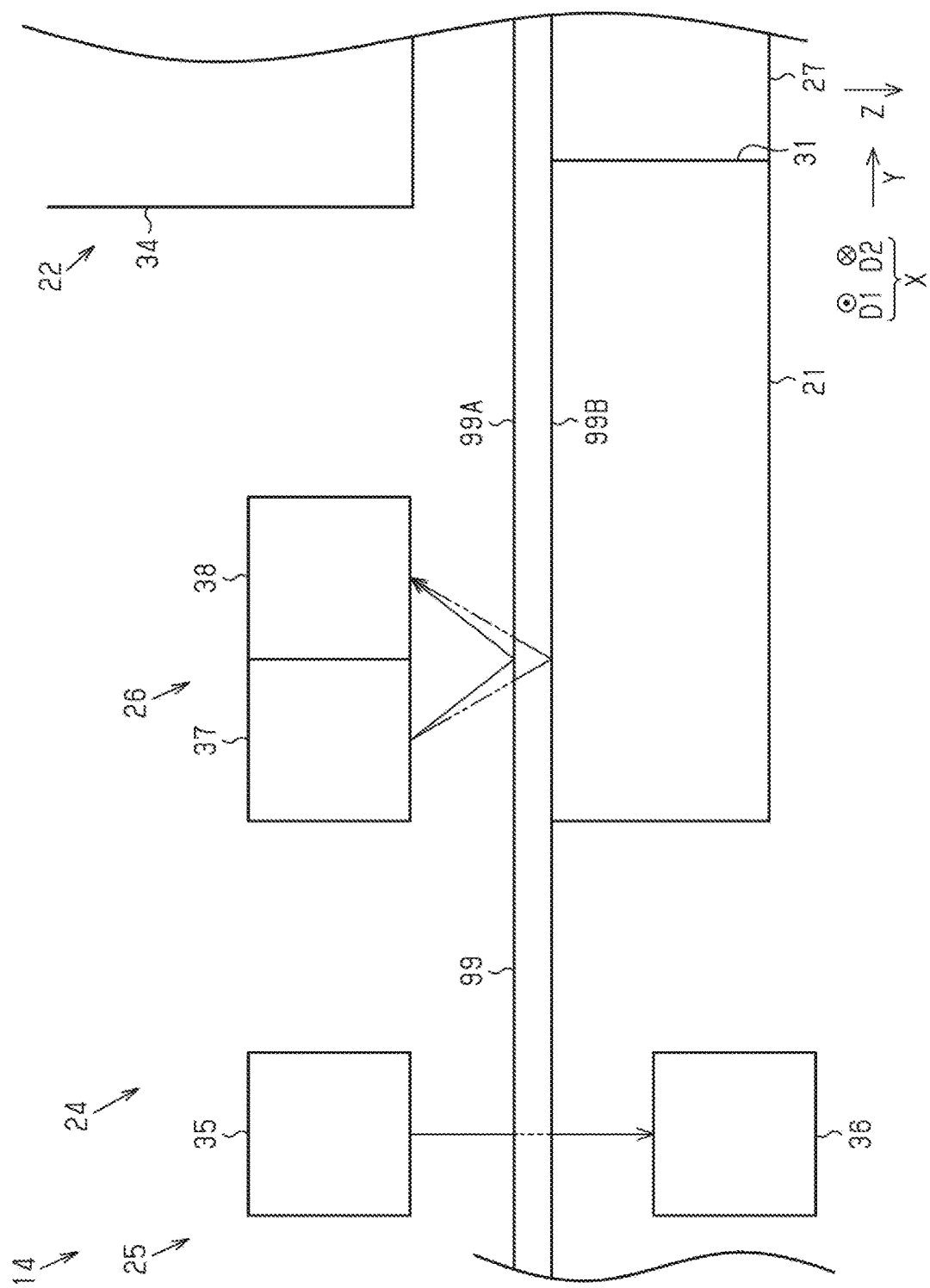
FIG. 2 is an enlarged view of FIG. 1.

As illustrated in FIG. 2, the first ultrasonic wave sensor 25 is positioned upstream of the first support unit 21 in the transport direction Y, for example. The first ultrasonic wave sensor 25 includes a first transmission unit 35 and a first reception unit 36. The first transmission unit 35 and the first reception unit 36 are positioned to sandwich the transported medium 99. In the first exemplary embodiment, the first transmission unit 35 and the first reception unit 36 are positioned to sandwich the transported medium 99 from above and below. Specifically, the medium 99 is transported to pass between the first transmission unit 35 and the first reception unit 36.

For example, the first transmission unit 35 is positioned above the first reception unit 36. The first transmission unit 35 is configured to transmit an ultrasonic wave. The first transmission unit 35 transmits an ultrasonic eave to the first reception unit 36. Specifically, the first transmission unit 35 transmits an ultrasonic wave downward. Thus, when the medium 99 is positioned between the first transmission unit 35 and the first reception unit 36, an ultrasonic wave transmitted from the first transmission unit 35 irradiates the medium 99. In this case, an ultrasonic wave transmitted from the first transmission unit 35 irradiates the medium 99 before printing. When the medium 99 is not positioned between the first transmission unit 35 and the first reception unit 36, an ultrasonic wave transmitted from the first transmission unit 35 directly irradiates the first reception unit 36.

For example, the first reception unit 36 is positioned below the first transmission unit 35. The first reception unit 36 is configured to receive an ultrasonic wave. The first reception unit 36 receives an ultrasonic wave transmitted from the first transmission unit 35. Specifically, the first reception unit 36 receives an ultrasonic wave radiated from above. Thus, when the medium 99 is present between the first transmission unit 35 and the first reception unit 36, the first reception unit 36 receives an ultrasonic wave that is transmitted from the first transmission unit 35 and passes through the medium 99. In this case, the first reception unit 36 receives an ultrasonic wave passing through the medium 99 before printing. When the medium 99 is not present between the first transmission unit 35 and the first reception unit 36, the first reception unit 36 directly receives an ultrasonic wave transmitted from the first transmission unit 35.

An ultrasonic wave transmitted from the first transmission unit 35 attenuates while passing through the medium 99. Thus, when the medium 99 is present between the first transmission unit 35 and the first reception unit 36, intensity of an ultrasonic wave received by the first reception unit 36 is lower than a case where the medium 99 is not positioned between the first transmission unit 35 and the first reception unit 36. An attenuation degree of an ultrasonic wave passing through the medium 99 varies depending on density, thickness, or the like of the medium 99.

Based on intensity of an ultrasonic wave received by the first reception unit 36 when the medium 99 is positioned between the first transmission unit 35 and the first reception unit 36, and intensity of an ultrasonic wave received by the first reception unit 36 when the medium 99 is not positioned between the first transmission unit 35 and the first reception unit 36, transmittance of an ultrasonic wave with respect to the medium 99 is detected. Transmittance of an ultrasonic wave with respect to the medium 99 indicates a ratio of an ultrasonic wave that passes through the medium 99 with respect to an ultrasonic wave transmitted from the first transmission unit 35.

Transmittance of an ultrasonic wave with respect to the medium 99 and a basis weight of the medium 99 are inter-related. For example, as transmittance of an ultrasonic wave with respect to the medium 99 is higher, a basis weight of the medium 99 is smaller. As transmittance of an ultrasonic wave with respect to the medium 99 is lower, a basis weight of the medium 99 is larger. In this manner, based on transmittance of an ultrasonic wave with respect to the medium 99, a basis weight of the medium 99 is detected. Therefore, the first ultrasonic wave sensor 25 is a sensor that detects a basis weight of the medium 99. The first control unit 23 may calculate a basis weight of the medium 99, based on a signal transmitted from the first ultrasonic wave sensor 25.

The second ultrasonic wave sensor 26 is positioned upstream of the printing unit 22 in the transport direction Y, for example. The second ultrasonic wave sensor 26 of the first exemplary embodiment is positioned between the first ultrasonic wave sensor 25 and the printing unit 22 in the transport direction Y.

The second ultrasonic wave sensor 26 includes a second transmission unit 37 and a second reception unit 38. The second transmission unit 37 and the second reception unit 38 face the first support unit 21. The second transmission unit 37 and the second reception unit 38 are positioned above the first support unit 21. In the first exemplary embodiment, the second transmission unit 37 and the second reception unit 38 are arrayed in the transport direction Y in the stated order.

The second transmission unit 37 is configured to transmit an ultrasonic wave. The second transmission unit 37 transmits an ultrasonic wave downward. The second transmission unit 37 irradiates the medium 99 or the first support unit 21 with an ultrasonic wave. Specifically, when the medium 99 is positioned below the second transmission unit 37, the second transmission unit 37 irradiates the medium 99 with an ultrasonic wave. In this case, the second transmission unit 37 irradiates the front surface 99A of the medium 99 with an ultrasonic wave. When the medium 99 is not positioned below the second transmission unit 37, the second transmission unit 37 irradiates the first support unit 21 with an ultrasonic wave.

An ultrasonic wave transmitted from the second transmission unit 37 is reflected by the medium 99 or the first support unit 21. In the first exemplary embodiment, when the medium 99 is positioned below the second transmission unit 37, an ultrasonic wave transmitted from the second transmission unit 37 is reflected by the medium 99. In this case, an ultrasonic wave transmitted from the second transmission unit 37 is reflected by the front surface 99A of the medium 99. When the medium 99 is not positioned below the second transmission unit 37, an ultrasonic wave transmitted from the second transmission unit 37 is reflected by the first support unit 21.

The second reception unit 38 is configured to receive an ultrasonic wave. The second reception unit 38 receives an ultrasonic wave transmitted from the second transmission unit 37. The second reception unit 38 receives an ultrasonic wave that is transmitted from the second transmission unit 37 and is reflected by the medium 99 or the first support unit 21. Specifically, when the medium 99 is positioned below the second transmission unit 37, the second reception unit 38 receives an ultrasonic wave that is transmitted from the second transmission unit 37 and is reflected by the medium 99. In this case, the second reception unit 38 receives an ultrasonic wave reflected by the front surface 99A of the medium 99. When the medium 99 is not positioned below the second transmission unit 37, the second reception unit 38 receives an ultrasonic wave that is transmitted from the second transmission unit 37 and is reflected by the first support unit 21. In this manner, the second reception unit 38 receives an ultrasonic wave that is reflected by the medium 99 supported by the first support unit 21 and an ultrasonic wave that is reflected by the first support unit 21.

When the second reception unit 38 receives an ultrasonic wave that is transmitted from the second transmission unit 37 and is reflected by a target object, a distance between the second ultrasonic wave sensor 26 and the target object is detected. Specifically, a distance between the second ultrasonic wave sensor 26 and the target object is detected by detecting a time period from transmission of an ultrasonic wave from the second transmission unit 37 to reception of the ultrasonic wave by the second reception unit 38, that is, so-called time-of-flight. In the first exemplary embodiment, the second ultrasonic wave sensor 26 detects a vertical distance between the second ultrasonic wave sensor 26 and the target object.

When the second reception unit 38 receives an ultrasonic wave that is transmitted from the second transmission unit 37 and is reflected by the front surface 99A of the medium 99, a distance between the second ultrasonic wave sensor 26 and the front surface 99A of the medium 99 is detected. When the second reception unit 38 receives an ultrasonic wave that is transmitted from the second transmission unit 37 and is reflected by the first support unit 21, a distance between the second ultrasonic wave sensor 26 and the first support unit 21 is detected. Here, a distance between the second ultrasonic wave sensor 26 and the first support unit 21 can be regarded as a distance between the second ultrasonic wave sensor 26 and the back surface 99B of the medium 99.

Based on a distance between the second ultrasonic wave sensor 26 and the front surface 99A and a distance between the second ultrasonic wave sensor 26 and the back surface 99B, a thickness of the medium 99, which is equivalent to a distance between the front surface 99A and the back surface 99B, can be grasped. Specifically, based on an ultrasonic wave that is reflected by the front surface 99A of the medium 99 and an ultrasonic wave that is reflected by the first support unit 21, a thickness of the medium 99 is detected. In this manner, the second ultrasonic wave sensor 26 is a sensor that detects a thickness of the medium 99. The first control unit 23 may calculate a thickness of the medium 99, based on a signal transmitted from the second ultrasonic wave sensor 26.

As illustrated in FIG. 1, for example, the first electrostatic capacitance sensor 27 is attached to the first support unit 21. The first electrostatic capacitance sensor 27 of the first exemplary embodiment is attached to the first attachment hole 31. The first electrostatic capacitance sensor 27 is positioned upstream of the head 33 in the transport direction Y. The first electrostatic capacitance sensor 27 of the first exemplary embodiment is positioned between the second ultrasonic wave sensor 26 and the head 33 in the transport direction Y.

Figure 3:
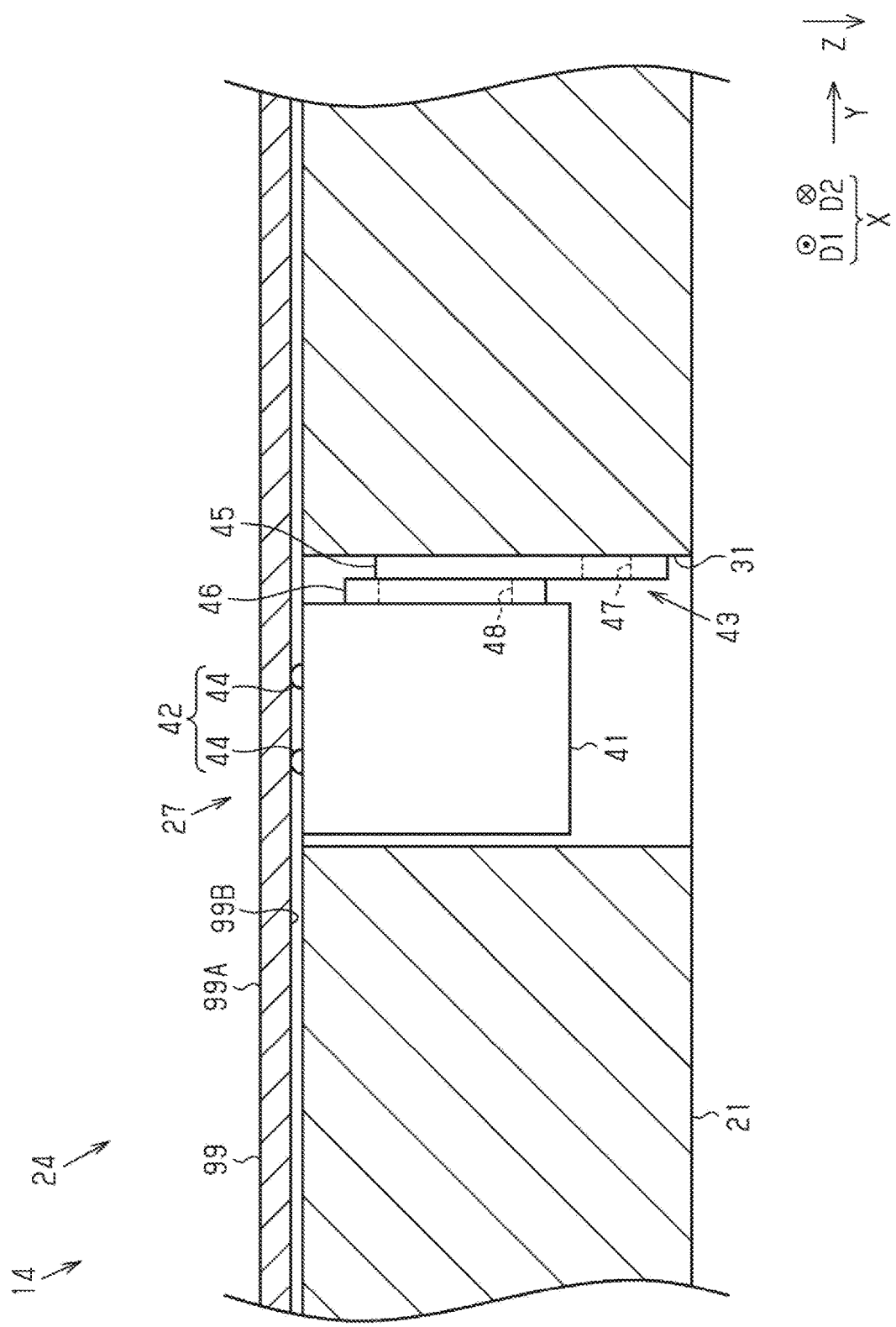
FIG. 3 is a cross-sectional view illustrating a first electrostatic capacitance sensor.

As illustrated in FIG. 3, the first electrostatic capacitance sensor 27 is positioned to be accommodated in the first attachment hole 31. The first electrostatic capacitance sensor 27 is positioned below the medium 99 supported by the first support unit 21. The first electrostatic capacitance sensor 27 is brought into contact with the medium 99 from below. The first electrostatic capacitance sensor 27 is brought into contact with the medium 99, and thus detects electrostatic capacitance of the medium 99. The first electrostatic capacitance sensor 27 of the first exemplary embodiment detects electrostatic capacitance of the medium 99 before printing, that is, before being subjected to processing.

The first electrostatic capacitance sensor 27 includes a first retaining unit 41, a first electrode pair 42, and a first position adjustment unit 43.

The first retaining unit 41 retains the first electrode pair 42. For example, a shape of the first retaining unit 41 is a rectangular parallelepiped shape or a rectangular parallelepiped-like shape. The first retaining unit 41 is attached to the first position adjustment unit 43.

The first electrode pair 42 is provided to protrude from the first retaining unit 41. The first electrode pair 42 of the first exemplary embodiment protrudes from an upper surface of the first retaining unit 41. The first electrode pair 42 is brought into contact with the medium 99 supported by the first support unit 21. In the first exemplary embodiment, the first electrode pair 42 is brought into contact with the back surface 99B of the medium 99. In this case, as compared to a case where the first electrode pair 42 is brought into contact with the front surface 99A of the medium 99, a risk of damaging the front surface 99A to be subjected to printing, that is, the front surface 99A to be subjected to processing is reduced.

The first electrode pair 42 constitutes part of an oscillation circuit included in the first electrostatic capacitance sensor 27. The first electrode pair 42 includes the two first electrodes 44. An alternating current (AC) voltage is applied between the two first electrodes 44. Specifically, the first electrostatic capacitance sensor 27 detects electrostatic capacitance between the two first electrodes 44. When the two first electrodes 44 are brought into contact with the medium 99, an alternating current (AC) flows to the medium 99. With this, the first electrostatic capacitance sensor 27 detects electrostatic capacitance of the medium 99 with which the first electrode pair 42 is brought into contact.

The first electrode pair 42 is brought into contact with the medium 99 before the head 33 ejects the liquid thereonto, that is, before being subjected to processing by the processing unit. Thus, the first electrostatic capacitance sensor 27 detects electrostatic capacitance of the medium 99 before being subjected to processing by the processing unit.

When an AC flows from the two first electrodes 44 to the medium 99, electrostatic capacitance between the two first electrodes 44 is changed. In this case, change in electrostatic capacitance between the two first electrodes 44 is greatly affected by an amount of moisture contained in the medium 99 with which the two first electrodes 44 are brought into contact. The reason is because water has permittivity higher than that of the medium 99 such as paper and fabric. Thus, for example, when an amount of moisture contained in the medium 99 is large, change in electrostatic capacitance between the two first electrodes 44 is large. When an amount of moisture contained in the medium 99 is small, change in electrostatic capacitance between the two first electrodes 44 is small. In this manner, change in electrostatic capacitance between the two first electrodes 44 and an amount of moisture contained in the medium 99 are inter-related.

Change in electrostatic capacitance between the two first electrodes 44 is affected by a basis weight of the medium 99 with which the two first electrodes 44 are brought into contact. For example, when a basis weight of the medium 99 is large, change in electrostatic capacitance between the two first electrodes 44 is large. When a basis weight of the medium 99 is small, change in electrostatic capacitance between the two first electrodes 44 is small.

Based on the matters described above, with the first ultrasonic wave sensor 25 and the first electrostatic capacitance sensor 27, an amount of moisture contained in the medium 99 is detected at high accuracy. Particularly, based on a specific weight of the medium 99, a thickness of the medium 99, and change in electrostatic capacitance between the two first electrodes 44, an amount of moisture contained in the medium 99 can be detected at high accuracy. The first control unit 23 may calculate an amount of moisture contained in the medium 99, based on a signal transmitted from the first ultrasonic wave sensor 25 and a signal transmitted from the first electrostatic capacitance sensor 27.

The first position adjustment unit 43 includes a first adjustment member 45 and a second adjustment member 46. In the first exemplary embodiment, the first adjustment member 45 and the second adjustment member 46 are positioned downstream of the first retaining unit 41 in the transport direction Y, but may be positioned upstream of the first retaining unit 41 in the transport direction Y.

For example, the first adjustment member 45 is a plate or plate-like member. The first adjustment member 45 is attached to the first support unit 21 and the second adjustment member 46. The first adjustment member 45 is attached to the first support unit 21 on an inner circumferential surface of the first attachment hole 31.

The first adjustment member 45 has a first elongated hole 47 extending in the scanning direction X. The first adjustment member 45 is screwed to the first support unit 21 through the first elongated hole 47, and thus is fixed to the first support unit 21. Specifically, the first adjustment member 45 is movable in the scanning direction X with respect to the first support unit 21. In this manner, a position of the first adjustment member 45 is adjustable in the scanning direction X with respect to the first support unit 21.

For example, the second adjustment member 46 is a plate or plate-like member. The second adjustment member 46 is attached to the first adjustment member 45 and the first retaining unit 41. The second adjustment member 46 is positioned between the first adjustment member 45 and the first retaining unit 41. The second adjustment member 46 is fixed to the first retaining unit 41.

The second adjustment member 46 has a second elongated hole 48 extending in the vertical direction Z. The second adjustment member 46 is screwed to the first adjustment member 45 through the second elongated hole 48, and thus is fixed to the first adjustment member 45. Specifically, the second adjustment member 46 is movable in the vertical direction Z with respect to the first adjustment member 45. In this manner, a position of the second adjustment member 46 is adjustable in the vertical direction Z with respect to the first adjustment member 45.

When the first adjustment member 45 moves in the scanning direction X with respect to the first support unit 21, the first electrode pair 42 moves in the scanning direction X with respect to the first support unit 21. When the second adjustment member 46 moves in the vertical direction Z with respect to the first adjustment member 45, the first electrode pair 42 moves the vertical direction Z with respect to the first support unit 21. In this manner, a position of the first electrostatic capacitance sensor 27 is adjustable with the first position adjustment unit 43 in the scanning direction X and the vertical direction Z. With this, a position of the first electrode pair 42 can be adjusted in such a way that the first electrode pair 42 is effectively brought into contact with the medium 99. Specifically, the first position adjustment unit 43 adjusts a position of the first electrode pair 42 with respect to the first support unit 21. The first position adjustment unit 43 of the first exemplary embodiment moves the first retaining unit 41 including the first electrode pair 42 as a whole, and thus adjusts a position of the first electrode pair 42 in a state in which a distance between the two first electrodes 44 is maintained.

As illustrated in FIG. 1, for example, the second electrostatic capacitance sensor 28 is attached to the first support unit 21. The second electrostatic capacitance sensor 28 of the first exemplary embodiment is attached to the second attachment hole 32. The second electrostatic capacitance sensor 28 is positioned downstream of the head 33 in the transport direction Y. The second electrostatic capacitance sensor 28 of the first exemplary embodiment is positioned between the head 33 and the optical sensor 29 in the transport direction Y. In the first exemplary embodiment, the configuration of the second electrostatic capacitance sensor 28 is the same as the first electrostatic capacitance sensor 27.

Figure 4:
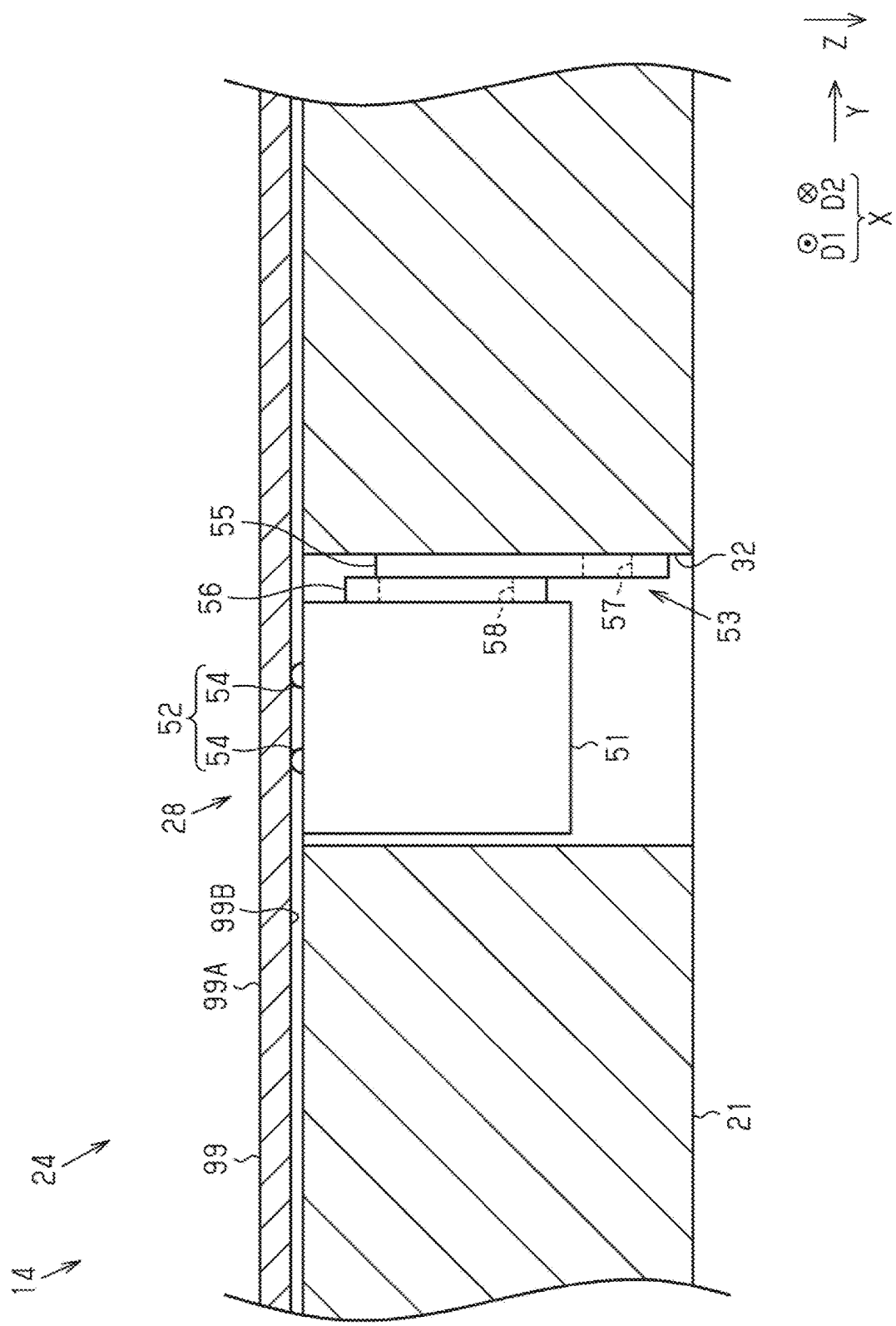
FIG. 4 is a cross-sectional view illustrating a second electrostatic capacitance sensor.

As illustrated in FIG. 4, the second electrostatic capacitance sensor 28 is positioned to be accommodated in the second attachment hole 32. The second electrostatic capacitance sensor 28 is positioned below the medium 99 supported by the first support unit 21. The second electrostatic capacitance sensor 28 is brought into contact with the medium 99 from below. The second electrostatic capacitance sensor 28 is brought into contact with the medium 99, and thus detects electrostatic capacitance of the medium 99. The second electrostatic capacitance sensor 28 of the first exemplary embodiment detects electrostatic capacitance of the medium 99 after printing, that is, after being subjected to processing.

The second electrostatic capacitance sensor 28 includes a second retaining unit 51, a second electrode pair 52, and a second position adjustment unit 53.

The second retaining unit 51 retains the second electrode pair 52. For example, a shape of the second retaining unit 51 is a rectangular parallelepiped shape or a rectangular parallelepiped-like shape. The second retaining unit 51 is attached to the second position adjustment unit 53.

The second electrode pair 52 is provided to protrude from the second retaining unit 51. The second electrode pair 52 of the first exemplary embodiment protrudes from an upper surface of the second retaining unit 51. The second electrode pair 52 is brought into contact with the medium 99 supported by the first support unit 21. In the first exemplary embodiment, the second electrode pair 52 is brought into contact with the back surface 99B of the medium 99. In this case, as compared to a case where the second electrode pair 52 is brought into contact with the front surface 99A of the medium 99, a risk of damaging the front surface 99A to be subjected to printing, that is, the front surface 99A to be subjected to processing is reduced.

The second electrode pair 52 constitutes part of an oscillation circuit included in the second electrostatic capacitance sensor 28. The second electrode pair 52 includes two second electrodes 54. An AC voltage is applied between the two second electrodes 54. Specifically, the second electrostatic capacitance sensor 28 detects electrostatic capacitance between the two second electrodes 54. When the two second electrodes 54 are brought into contact with the medium 99, an AC flows to the medium 99. With this, the second electrostatic capacitance sensor 28 detects electrostatic capacitance of the medium 99 with which the second electrode pair 52 is brought into contact.

The second electrode pair 52 is brought into contact with the medium 99 after the head 33 ejects the liquid thereonto, that is, after being subjected to processing by the processing unit. The second electrostatic capacitance sensor 28 detects electrostatic capacitance of the medium 99 after printing, that is, after being subjected to processing by the processing unit.

When an AC flows from the two second electrodes 54 to the medium 99, electrostatic capacitance between the two second electrodes 54 is changed. In this case, change in electrostatic capacitance between the two second electrodes 54 is greatly affected by an amount of moisture contained in the medium 99 with which the two second electrodes 54 are brought into contact. Thus, for example, when an amount of moisture contained in the medium 99 is large, change in electrostatic capacitance between the two second electrodes 54 is large. When an amount of moisture contained in the medium 99 is small, change in electrostatic capacitance between the two second electrodes 54 is small. In this manner, change in electrostatic capacitance between the two second electrodes 54 and an amount of moisture contained in the medium 99 are inter-related.

Change in electrostatic capacitance between the two second electrodes 54 is affected by a basis weight of the medium 99 with which the two second electrodes 54 are brought into contact. For example, when a basis weight of the medium 99 is large, change in electrostatic capacitance between the two second electrodes 54 is large. When a basis weight of the medium 99 is small, change in electrostatic capacitance between the two second electrodes 54 is small.

Based on the matters described above, with the first ultrasonic wave sensor 25 and the second electrostatic capacitance sensor 28, an amount of moisture contained in the medium 99 is detected at high accuracy. Particularly, based on a specific weight of the medium 99, a thickness of the medium 99, and change in electrostatic capacitance between the two second electrodes 54, an amount of moisture contained in the medium 99 can be detected at high accuracy. The first control unit 23 may calculate an amount of moisture contained in the medium 99, based on a signal transmitted from the first ultrasonic wave sensor 25 and a signal transmitted from the second electrostatic capacitance sensor 28.

The second position adjustment unit 53 includes a third adjustment member 55 and a fourth adjustment member 56. In the first exemplary embodiment, the third adjustment member 55 and the fourth adjustment member 56 are positioned downstream of the second retaining unit 51 in the transport direction Y, but may be positioned upstream of the second retaining unit 51 in the transport direction Y.

For example, the third adjustment member 55 is a plate or plate-like member. The third adjustment member 55 is attached to the first support unit 21 and the fourth adjustment member 56. The third adjustment member 55 is attached to the first support unit 21 on an inner circumferential surface of the second attachment hole 32.

The third adjustment member 55 has a third elongated hole 57 extending in the scanning direction X. The third adjustment member 55 is screwed to the first support unit 21 through the third elongated hole 57, and thus is fixed to the first support unit 21. Specifically, the third adjustment member 55 is movable in the scanning direction X with respect to the first support unit 21. In this manner, a position of the third adjustment member 55 is adjustable in the scanning direction X with respect to the first support unit 21.

For example, the fourth adjustment member 56 is a plate or plate-like member. The fourth adjustment member 56 is attached to the third adjustment member 55 and the second retaining unit 51. The fourth adjustment member 56 is positioned between the third adjustment member 55 and the second retaining unit 51. The fourth adjustment member 56 is fixed to the second retaining unit 51.

The fourth adjustment member 56 has a fourth elongated hole 58 extending in the vertical direction Z. The fourth adjustment member 56 is screwed to the third adjustment member 55 through the fourth elongated hole 58, and thus is fixed to the third adjustment member 55. Specifically, the fourth adjustment member 56 is movable in the vertical direction Z with respect to the third adjustment member 55. In this manner, a position of the fourth adjustment member 56 is adjustable in the vertical direction Z with respect to the third adjustment member 55.

When the third adjustment member 55 moves in the scanning direction X with respect to the first support unit 21, the second electrode pair 52 moves in the scanning direction X with respect to the first support unit 21. When the fourth adjustment member 56 moves in the vertical direction Z with respect to the third adjustment member 55, the second electrode pair 52 moves the vertical direction Z with respect to the first support unit 21. In this manner, a position of the second electrostatic capacitance sensor 28 is adjustable with the second position adjustment unit 53 in the scanning direction X and the vertical direction Z. With this, a position of the second electrode pair 52 can be adjusted in such a way that the second electrode pair 52 is effectively brought into contact with the medium 99. Specifically, the second position adjustment unit 53 adjusts a position of the second electrode pair 52 with respect to the first support unit 21. The second position adjustment unit 53 of the first exemplary embodiment moves the second retaining unit 51 including the second electrode pair 52 as a whole, and thus adjusts a position of the second electrode pair 52 in a state in which a distance between the two second electrodes 54 is maintained.

As illustrated in FIG. 1, the optical sensor 29 is positioned downstream of the head 33 in the transport direction Y. The optical sensor 29 faces the first support unit 21. The optical sensor 29 is positioned above the first support unit 21. For example, the optical sensor 29 is attached to the carriage 34. The optical sensor 29 of the first exemplary embodiment is attached to a surface of the carriage 34, which faces downstream in the transport direction Y. The optical sensor 29 is attached to the carriage 34, and thus scans the medium 99 together with the carriage 34.

Figure 5:
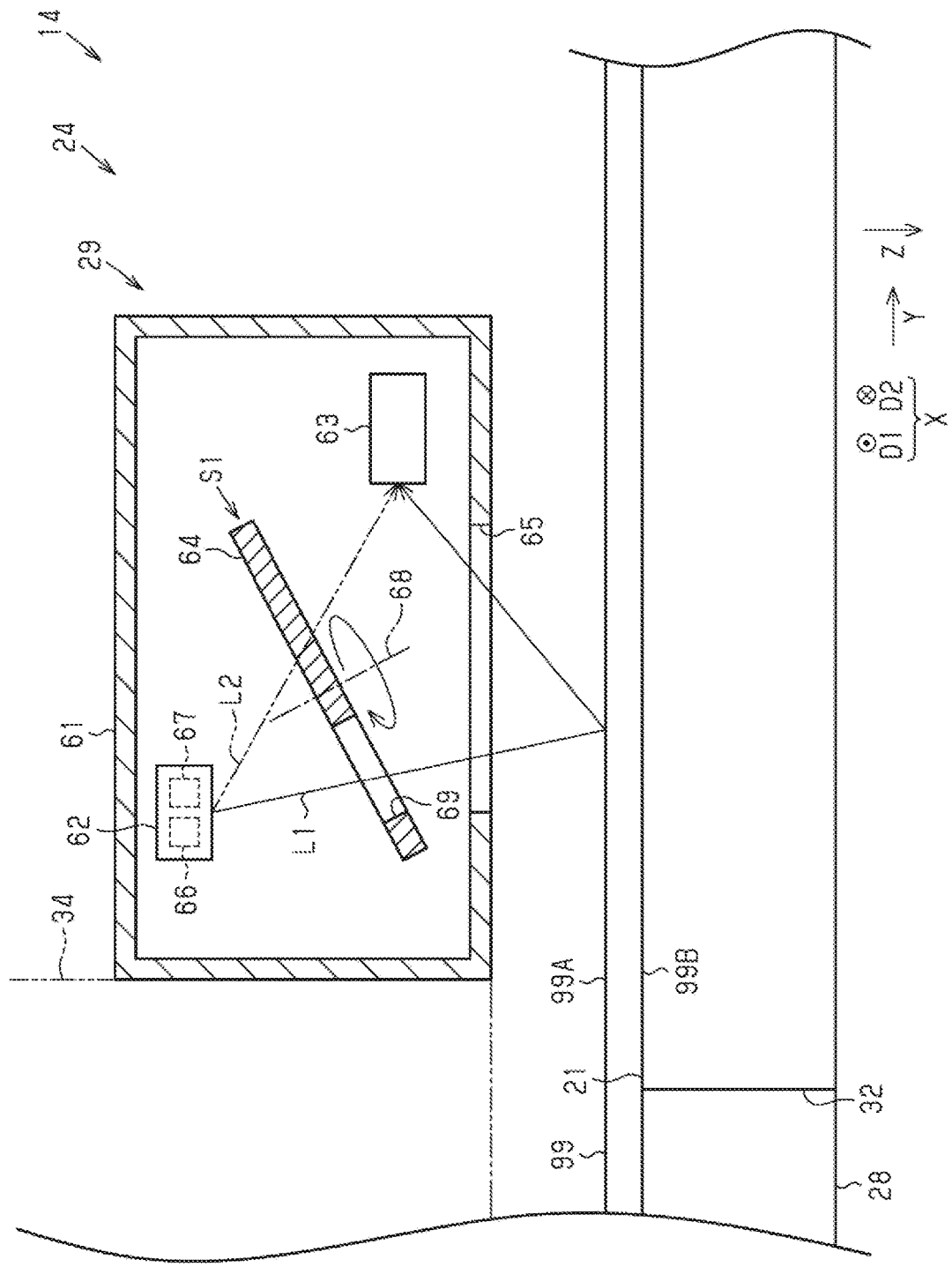
FIG. 5 is a cross-sectional view of an optical sensor including a light shielding unit in a first state.
Figure 6:
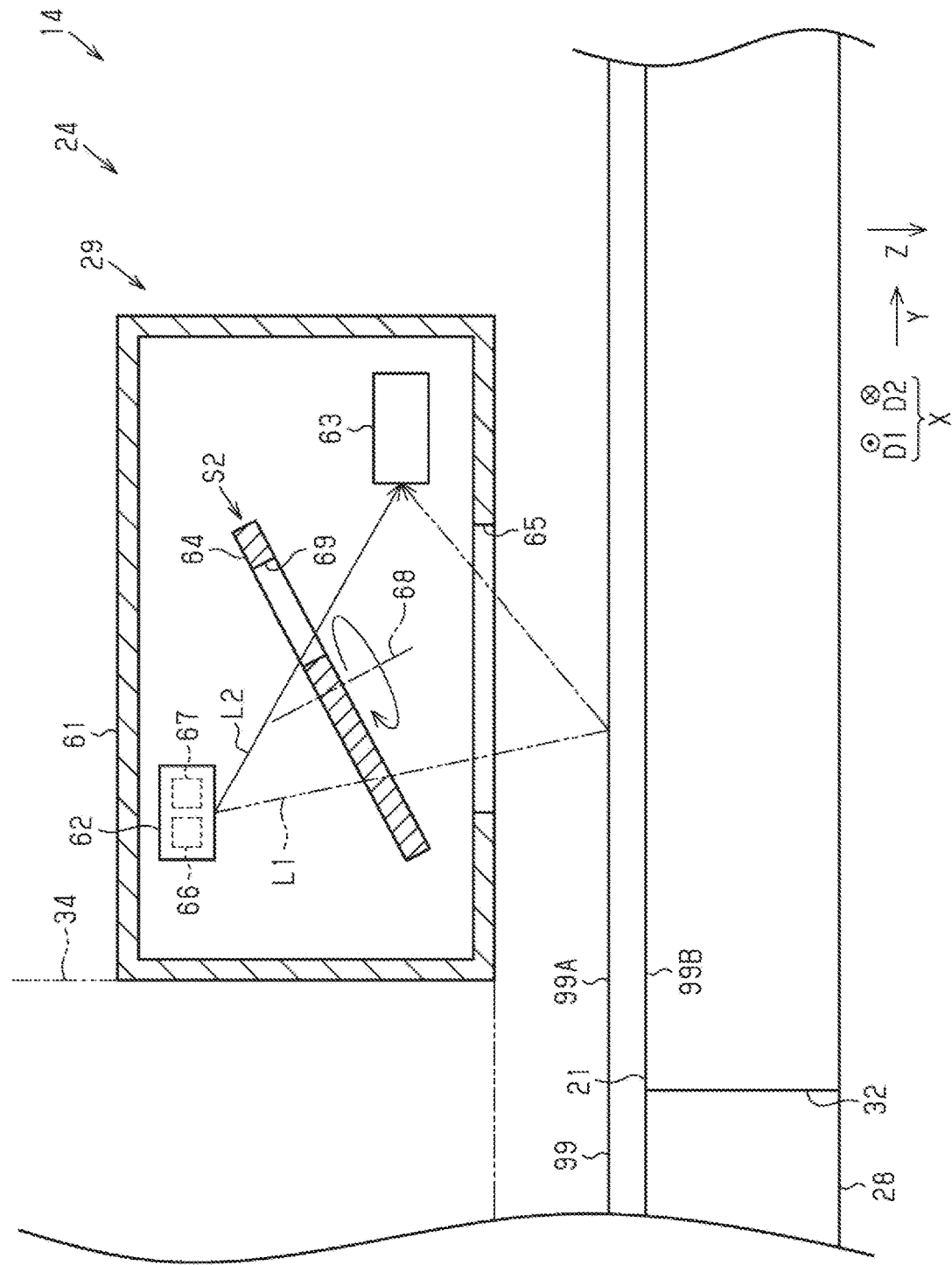
FIG. 6 is a cross-sectional view of the optical sensor including the light shielding unit in a second state.

As illustrated in FIG. 5 and FIG. 6, the optical sensor 29 includes a case 61, a light source 62, and a light receiving unit 63. The optical sensor 29 of the first exemplary embodiment includes a light shielding unit 64. The optical sensor 29 is an optical sensor of a reflection type.

The case 61 accommodates the light source 62, the light receiving unit 63, and the light shielding unit 64. For example, a shape of the case 61 is a rectangular parallelepiped shape or a rectangular parallelepiped-like shape. The case 61 has an opening 65. The opening 65 is provided in a surface of the case 61, which faces the first support unit 21. Specifically, in the first exemplary embodiment, the opening 65 is provided in a lower surface of the case 61. An inner part of the case 61 and an outer part of the case 61 communicate with each other through the opening 65.

The light source 62 emits light. The light source 62 emits light having a peak wavelength being an absorption wavelength of water. For example, the light source 62 is configured to emit light having a peak wavelength from 900 nm to 2,100 nm. The light source 62 of the first exemplary embodiment emits near infrared light.

The light source 62 of the first exemplary embodiment radiates light downward. Thus, the light source of the first exemplary embodiment radiates light on the medium 99 supported by the first support unit 21. Thus, for example, the light source 62 of the first exemplary embodiment radiates light on the medium 99 after being subjected to processing by the head 33. In this case, the light source 62 radiates light on the front surface 99A of the medium 99.

The light source 62 includes one or a plurality of light emitting elements that emit light. In the first exemplary embodiment, the light source 62 includes a plurality of light emitting elements. Specifically, the light source 62 includes a plurality of light emitting elements having different peak wavelengths. For example, the light emitting elements are LEDs. For example, the light source 62 includes a first light emitting element 66 and a second light emitting element 67. The light source 62 may include three or more light emitting elements.

For example, the first light emitting element 66 is a light emitting element that emits light having a peak wavelength of 940 nm. 940 nm is an absorption wavelength of water. For example, the second light emitting element 67 is a light emitting element that emits light having a peak wavelength of 1,450 nm. 1,450 nm is an absorption wavelength of water. Each of the first light emitting element 66 and the second light emitting element 67 is only required to be a light emitting element that emits light having a peak wavelength being an absorption wavelength of water. For example, the first light emitting element 66 may be a light emitting element that emits light having a peak wavelength of 1,800 nm, a light emitting element that emits light having a peak wavelength of 1,940 nm, or a light emitting element that emits light having a peak wavelength of 2,100 nm. Similarly, the second light emitting element 67 may be a light emitting element that emits light having a peak wavelength of 1,800 nm, a light emitting element that emits light having a peak wavelength of 1,940 nm, or a light emitting element that emits light having a peak wavelength of 2,100 nm. Any one of 1,800 nm, 1,940 nm, and 2,100 nm is an absorption wavelength of water.

The light receiving unit 63 receives light emitted from the light source 62. For example, the light receiving unit 63 includes a light receiving element. For example, the light receiving element is a photodiode. The light receiving unit 63 receives light advancing through a detection optical path L1 or from the light source 62 or light advancing through a reference optical path L2 from the light source 62. Specifically, light emitted from the light source 62 advances through the detection optical path L1 or the reference optical path L2, and thus enters the light receiving unit 63.

The detection optical path L1 is an optical path through which light emitted from the light source 62 enters the light receiving unit 63 by being reflected by the medium 99 supported by the first support unit 21. The detection optical path L1 is an optical path indicated with the solid line in FIG. 5 and with the two-dot chain line in FIG. 6. The detection optical path L1 extends from the inner part of the case 61 to the outer part of the case 61 through the opening 65. The detection optical path L1 extends from the light source 62 to the medium 99 supported by the first support unit 21, and then extends from the medium 99 to the light receiving unit 63.

First, light advancing through the detection optical path L1 passes through the opening 65 from the light source 62, and abuts on the medium 99. In this case, light advancing through the detection optical path L1 abuts on the front surface 99A of the medium 99. The light that abuts on the front surface 99A of the medium 99 is reflected by the front surface 99A of the medium 99. The light reflected by the front surface 99A of the medium 99 passes through the opening 65, and then enters the light receiving unit 63. In this manner, the light emitted from the light source 62 advances through the detection optical path L1. As a result, the light receiving unit 63 receives light reflected by the medium 99.

The reference optical path L2 is an optical path through which light emitted from the light source 62 enters the light receiving unit 63 without being reflected by the medium 99 supported by the first support unit 21. The reference optical path L2 is an optical path indicated with the two-dot chain line in FIG. 5 and with the solid line in FIG. 6. The reference optical path L2 extends in the inner part of the case 61. The reference optical path L2 extends straight from the light source 62 to the light receiving unit 63 in the inner part of the case 61. Thus, light advancing through the reference optical path L2 directly enters the light receiving unit 63 from the light source 62. With this, the light receiving unit 63 directly receives light emitted from the light source 62.

The light shielding unit 64 is configured to block light emitted from the light source 62. For example, a shape of the light shielding unit 64 is a plate shape or a plate-like shape. The light shielding unit 64 is positioned between the light source 62 and the light receiving unit 63 in the inner part of the case 61. For example, the light shielding unit 64 is positioned to be across the detection optical path L1 and the reference optical path L2. The light shielding unit 64 closes the detection optical path L1 or the reference optical path L2. The light shielding unit 64 closes the detection optical path L1 or the reference optical path L2, and thus blocks light emitted from the light source 62.

The light shielding unit 64 is configured to be switched between a first state S1 and a second state S2. The light shielding unit 64 illustrated in FIG. 5 is in the first state S1. The light shielding unit 64 illustrated in FIG. 6 is in the second state S2.

For example, the light shielding unit 64 is displaced, and thus is switched between the first state S1 and the second state S2. The light shielding unit 64 of the first exemplary embodiment is configured to be rotated about a rotary axis 68 being a virtual axis. The light shielding unit 64 of the first exemplary embodiment is rotated about the rotary axis 68, and thus is switched between the first state S1 and the second state S2. For example, the light shielding unit 64 is supported by the case 61 under a state of being rotatable about the rotary axis 68.

For example, the light shielding unit 64 has a hole 69. When the light shielding unit 64 is in the first state S1, the hole 69 is positioned on the detection optical path L1. Thus, when the light shielding unit 64 is in the first state S1, light advancing through the detection optical path L1 from the light source 62 passes through the hole 69, and then enters the light receiving unit 63. Specifically, in the first state S1, the light shielding unit 64 allows light emitted from the light source 62 to advance through the detection optical path L1. Further, when the light shielding unit 64 is in the first state S1, the hole 69 is not positioned on the reference optical path L2. Specifically, in the first state S1, the light shielding unit 64 does not allow light emitted from the light source 62 to advance through the reference optical path L2. In this manner, the first state S1 of the light shielding unit 64 is a state in which the light shielding unit 64 does not shield the detection optical path L1 but the light shielding unit 64 shields the reference optical path L2.

When the light shielding unit 64 is in the second state S2, the hole 69 is positioned on the reference optical path L2. Thus, when the light shielding unit 64 is in the second state S2, light advancing through the reference optical path L2 from the light source 62 passes through the hole 69, and then enters the light receiving unit 63. Specifically, in the second state S2, the light shielding unit 64 allows light emitted from the light source 62 to advance through the reference optical path L2. Further, when the light shielding unit 64 is in the second state S2, the hole 69 is not positioned on the detection optical path L1. Specifically, in the second state S2, the light shielding unit 64 does not allow light emitted from the light source 62 to advance through the detection optical path L1. In this manner, the second state S2 of the light shielding unit 64 is a state in which the light shielding unit 64 shields the detection optical path L1 and the light shielding unit 64 does not shield the reference optical path L2.

The light shielding unit 64 is switched between the first state S1 and the second state S2, and thus an optical path through which light emitted from the light source 62 advances is determined. In the first exemplary embodiment, the first control unit 23 switches the light shielding unit 64 between the first state S1 and the second state S2.

When the light source 62 irradiates the medium 99 with light, that is, light advancing through the detection optical path L1 abuts on the medium 99, part of light is absorbed in the medium 99. Particularly, near infrared light emitted from the light source 62 is likely to be absorbed in water. Thus, when an amount of moisture contained in the medium 99 is larger, more light is absorbed in the medium 99. In contrast, when an amount of moisture contained in the medium 99 is small, less light is absorbed in the medium 99.

When the light receiving unit 63 receives light advancing through the detection optical path L1, intensity of light reflected by the medium 99 is detected. When the light receiving unit 63 receives light advancing through the reference optical path L2, intensity of light radiated by the light source 62 on the medium 99 is detected. Based on intensity of light advancing through the detection optical path L1 and intensity of light advancing through the reference optical path L2, reflectance of light with respect to the medium 99 is detected. Here, reflectance of light with respect to the medium 99 is a ratio of light reflected by the medium 99 with respect to light radiated on the medium 99.

Reflectance of light with respect to the medium 99 and an amount of moisture contained in the medium 99 are interrelated. For example, as reflectance of light with respect to the medium 99 is higher, an amount of moisture contained in the medium 99 is smaller. As reflectance of light with respect to the medium 99 is lower, an amount of moisture contained in the medium 99 is larger. In this manner, based on reflectance of light with respect to the medium 99, an amount of moisture contained in the medium 99 is detected. Therefore, the optical sensor 29 of the first exemplary embodiment is a sensor that detects an amount of moisture contained in the medium 99 after printing, that is, after processing. The optical sensor 29 can particularly detect an amount of moisture of the front surface 99A at high accuracy. The first control unit 23 may calculate an amount of moisture contained in the medium 99, based on a signal transmitted from the optical sensor 29.

The optical sensor 29 mainly detects an amount of moisture contained in the front surface 99A of the medium 99. Meanwhile, the first electrostatic capacitance sensor 27 and the second electrostatic capacitance sensor 28 mainly detect an amount of moisture contained in the back surface 99B of the medium 99 and in an inner part of the medium 99. Thus, with the optical sensor 29, the first electrostatic capacitance sensor 27, and the second electrostatic capacitance sensor 28, an amount of moisture contained in the medium 99 is detected at high accuracy.

When the head 33 ejects the liquid onto the medium 99, most part of the liquid is left on the front surface 99A of the medium 99 in some cases. In this case, with reference to a detection result of the first electrostatic capacitance sensor 27 and a detection result of the second electrostatic capacitance sensor 28, it can be grasped that increase in amount of moisture contained in the medium 99 is large with respect to an amount of the liquid ejected from the head 33. In this case, with reference to a detection result of the first electrostatic capacitance sensor 27 and a detection result of the optical sensor 29, it can be grasped that, because the liquid is left on the front surface 99A of the medium 99, increase in amount of moisture contained in the medium 99 is large with respect to an amount of the liquid ejected from the head 33. Based on the matters described above, it can be grasped that the medium 99 has characteristics of being less likely to absorb the liquid. In this manner, based on a detection result of the first electrostatic capacitance sensor 27, a detection result of the second electrostatic capacitance sensor 28, and a detection result of the optical sensor 29, characteristics of the medium 99 can be grasped.

As illustrated in FIG. 1, the drying device 15 is positioned downstream of the printing device 14 in the transport direction Y. The drying device 15 is a device that dries the medium 99. The drying device 15 dries the medium 99 subjected to printing by the printing device 14. The drying device 15 is one example of a processing device. Specifically, the drying device 15 dries the medium 99, and thus subjects the medium 99 to processing. In the printing system 11, the medium 99 is subjected to processing by the printing device 14 and the drying device 15 in the stated order.

The drying device 15 of the first exemplary embodiment includes a second support unit 71, an accommodation body 72, heating units 73, and a second control unit 74.

For example, the second support unit 71 is a plate-like member. The second support unit 71 supports the transported medium 99. The second support unit 71 supports the medium 99 subjected to printing by the printing device 14. The second support unit 71 of the first exemplary embodiment supports the medium 99 from below. The second support unit 71 of the first exemplary embodiment is brought into contact with the back surface 99B of the medium 99. The second support unit 71 is a support unit included in the drying device 15 in the printing system 11.

The accommodation body 72 faces the second support unit 71. The accommodation body 72 of the first exemplary embodiment is positioned above the second support unit 71. For example, the accommodation body 72 is a box. The accommodation body 72 has an opening 75 in a surface facing the second support unit 71. Thus, the opening 75 is oriented downward in the accommodation body 72. The accommodation body 72 accommodates the heating units 73.

The heating units 73 face the second support unit 71. The heating units 73 of the first exemplary embodiment are positioned above the second support unit 71. The heating units 73 are configured to heat the medium 99. For example, the heating units 73 are heater tubes extending in the scanning direction X. In the first exemplary embodiment, the two heating units 73 are provided. The two heating units 73 are arrayed at an interval in the transport direction Y.

The heating units 73 generate heat. The generated heat propagates to the second support unit 71 through the opening 75. With this, the heating units 73 heat the medium 99 supported by the second support unit 71. In this case, the heating units 73 heat the front surface 99A of the medium 99. The heating units 73 heat the medium 99, and thus dries the liquid ejected onto the medium 99. As a result, the medium 99 is dried.

When the heating units 73 heat the medium 99, an amount of moisture contained in the medium 99 is reduced. Specifically, when the heating units 73 heat the medium 99, the medium 99 is subjected to processing of reducing an amount of moisture contained in the medium 99. The heating units 73 subjects the front surface 99A of the medium 99 to processing, which is opposite to the back surface 99B with which the second support unit 71 is brought into contact. In this respect, each of the heating units 73 of the first exemplary embodiment is one example of a processing unit.

The second control unit 74 controls the various configurations of the drying device 15. For example, the second control unit 74 controls the heating units 73. The second control unit 74 is a control unit included in the drying device 15 in the printing system 11.

The second control unit 74 of the first exemplary embodiment is communicable with the retaining device 12, the winding device 13, and the printing device 14. As required, the second control unit 74 receives a signal from the retaining device 12, the winding device 13, and the printing device 14, and transmits a signal to the retaining device 12, the winding device 13, and the printing device 14. For example, the second control unit 74 and the first control unit 23 are mutually communicated with each other. The second control unit 74 may integrally control the printing system 11.

Similarly to the first control unit 23, the second control unit 74 may be configured as α: one or more processors that executes various processing in accordance with computer programs, β: one or more special purpose hardware circuit such as a special purpose integrated circuit, which executes at least part of processing of the various processing, or γ: a circuit including a combination of those. The processor includes a CPU and a memory such as a RAM and a ROM, and the memory stores program codes or commands configured to cause the CPU to execute processing. The memory, or a computer readable medium includes any readable medium accessible by a general purpose or special purpose computer.

Next, the functions and effects of the exemplary embodiment described above are described.

(1) The detection device 24 includes the electrostatic capacitance sensors including the first electrostatic capacitance sensor 27 and the second electrostatic capacitance sensor 28, and the first ultrasonic wave sensor 25. Thus, based on electrostatic capacitance of the medium 99, which is detected by the electrostatic capacitance sensor, and a basis weight of the medium 99, which is detected by the first ultrasonic wave sensor 25, an amount of moisture contained in the medium 99 can be detected.

(2) The detection device 24 includes the second reception unit 38 that receives an ultrasonic wave reflected by the medium 99 supported by the first support unit 21 and an ultrasonic wave reflected by the first support unit 21. Specifically, based on an ultrasonic wave that is reflected by the medium 99 supported by the first support unit 21 and an ultrasonic wave that is reflected by the first support unit 21, a thickness of the medium 99 can be detected.

(3) The first electrostatic capacitance sensor 27 includes the first position adjustment unit 43. According to this, when a position of the first electrode pair 42 with respect to the first support unit 21 is adjusted, the first electrode pair 42 can be effectively brought into contact with the medium 99. Further, the second electrostatic capacitance sensor 28 includes the second position adjustment unit 53. According to this, when a position of the second electrode pair 52 with respect to the first support unit 21 is adjusted, the second electrode pair 52 can be effectively brought into contact with the medium 99.

(4) The first position adjustment unit 43 adjusts a position of the first electrode pair 42 in a state in which a distance between the two first electrodes 44 is maintained. According to this, even when a position of the first electrode pair 42 is adjusted, electrostatic capacitance of the medium 99 can be detected at high accuracy. Further, the second position adjustment unit 53 adjusts a position of the second electrode pair 52 in a state in which a distance between the two second electrodes 54 is maintained. According to this, even when a position of the second electrode pair 52 is adjusted, electrostatic capacitance of the medium 99 can be detected at high accuracy.

(5) The first electrostatic capacitance sensor 27 and the first ultrasonic wave sensor 25 detect an amount of moisture contained in the medium 99 before being subjected to processing. The second electrostatic capacitance sensor 28 and the first ultrasonic wave sensor 25 detect an amount of moisture contained in the medium 99 after being subjected to processing. With this, decrease in amount of moisture contained in the medium 99 with respect to processing or increase in amount of moisture contained in the medium 99 with respect to processing can be detected. Therefore, an amount of moisture contained in the medium 99 can be detected at high accuracy.

(6) The first electrode pair 42 and the second electrode pair 52 are brought into contact with the back surface 99B. In this case, as compared to a case where the first electrode pair 42 and the second electrode pair 52 are brought into contact with the front surface 99A of the medium 99, a risk of damaging the front surface 99A to be subjected to printing, that is, the front surface 99A to be subjected to processing is reduced.

Second Embodiment

Next, a second embodiment is described. The second exemplary embodiment is different from the first exemplary embodiment in that the drying device 15 includes the detection device 24. With regard to the second exemplary embodiment, differences from the first exemplary embodiment are mainly described.

Figure 7:
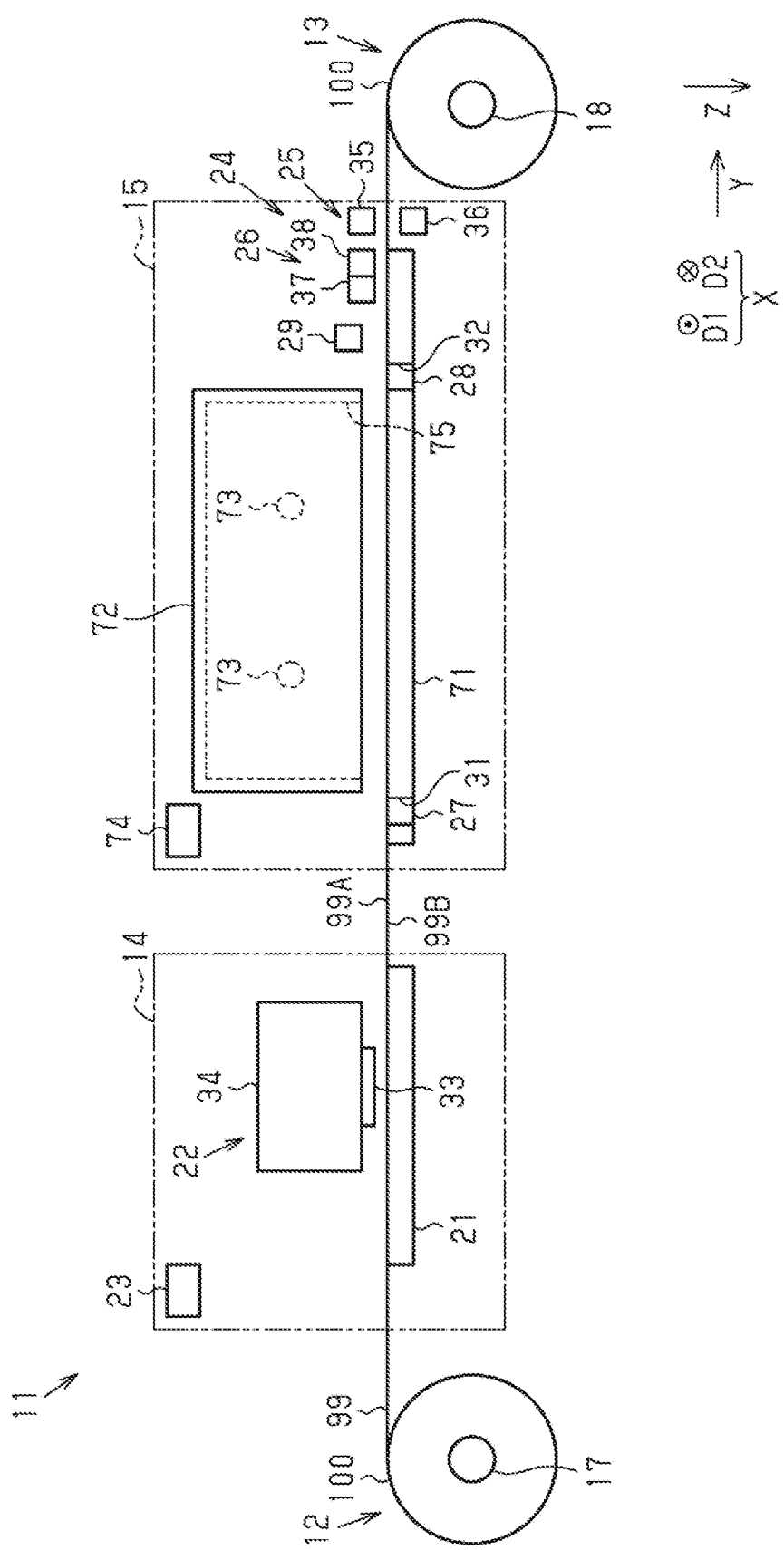
FIG. 7 is a schematic view illustrating a printing system including processing devices including a detection device of a second exemplary embodiment.

As illustrated in FIG. 7, the drying device 15 includes the second support unit 71, the accommodation body 72, the heating units 73, and the second control unit 74. The drying device 15 of the second exemplary embodiment includes the detection device 24. Specifically, the drying device 15 of the second exemplary embodiment includes the first ultrasonic wave sensor 25, the second ultrasonic wave sensor 26, the first electrostatic capacitance sensor 27, the second electrostatic capacitance sensor 28, and the optical sensor 29. The detection device 24 of the second exemplary embodiment detects an amount of moisture contained in the medium 99 supported by the second support unit 71.

The second support unit 71 of the second exemplary embodiment has a first attachment hole 31 for attaching the first electrostatic capacitance sensor 27 and a second attachment hole 32 for attaching the second electrostatic capacitance sensor 28. For example, the first attachment hole 31 and the second attachment hole 32 are positioned in a region of the second support unit 71, which does not face the accommodation body 72. The first attachment hole 31 of the second exemplary embodiment is positioned upstream of the accommodation body 72 in the transport direction Y. The second attachment hole 32 of the second exemplary embodiment is positioned downstream of the accommodation body 72 in the transport direction Y.

The first ultrasonic wave sensor 25 of the second exemplary embodiment is positioned downstream of the second support unit 71 in the transport direction Y. The first ultrasonic wave sensor 25 of the second exemplary embodiment is positioned between the second support unit 71 and the winding device 13 in the transport direction Y.

The first ultrasonic wave sensor 25 detects a basis weight of the medium 99 after being subjected to processing by the heating units 73. Specifically, the first ultrasonic wave sensor 25 detects a basis weight of the medium 99 after being heated. With this, when the first ultrasonic wave sensor 25 detects a basis weight of the medium 99, an influence of the liquid ejected onto the medium 99 from the head 33 is suppressed. This is because, when a large amount of liquid is contained in the medium 99, it is difficult to detect a basis weight of the medium 99 at high accuracy.

The second ultrasonic wave sensor 26 of the second exemplary embodiment faces the second support unit 71. The second ultrasonic wave sensor 26 is positioned above the second support unit 71. The second ultrasonic wave sensor 26 of the second exemplary embodiment is positioned downstream of the heating units 73 in the transport direction Y. The second ultrasonic wave sensor 26 of the second exemplary embodiment is positioned between the accommodation body 72 and the first ultrasonic wave sensor 25 in the transport direction Y.

The second ultrasonic wave sensor 26 detects a thickness of the medium 99 after being subjected to processing by the heating units 73. Specifically, the second ultrasonic wave sensor 26 detects a basis weight of the medium 99 after being heated. With this, when the second ultrasonic wave sensor 26 detects a thickness of the medium 99, an influence of the liquid ejected onto the medium 99 is suppressed. This is because, when a large amount of liquid is contained in the medium 99, the medium 99 swells in some cases, which makes it difficult to detect a thickness of the medium 99 at high accuracy.

The first electrostatic capacitance sensor 27 of the second exemplary embodiment is attached to the second support unit 71. The first electrostatic capacitance sensor 27 of the second exemplary embodiment is attached to the first attachment hole 31. The first electrostatic capacitance sensor 27 is positioned upstream of the heating units 73 in the transport direction Y. The first electrostatic capacitance sensor 27 of the second exemplary embodiment is positioned upstream of the accommodation body 72 in the transport direction Y.

The first electrostatic capacitance sensor 27 of the second exemplary embodiment detects an amount of moisture contained in the medium 99 before being heated by the heating units 73. Specifically, the first electrostatic capacitance sensor 27 of the second exemplary embodiment detects an amount of moisture contained in the medium 99 before being subjected to processing by the heating units 73.

The second electrostatic capacitance sensor 28 of the second exemplary embodiment is attached to the second support unit 71. The second electrostatic capacitance sensor 28 of the second exemplary embodiment is attached to the second attachment hole 32. The second electrostatic capacitance sensor 28 is positioned downstream of the heating units 73 in the transport direction Y. The second electrostatic capacitance sensor 28 of the second exemplary embodiment is positioned upstream of the accommodation body 72 in the transport direction Y.

The second electrostatic capacitance sensor 28 of the second exemplary embodiment detects an amount of moisture contained in the medium 99 after being heated by the heating units 73. Specifically, the second electrostatic capacitance sensor 28 detects an amount of moisture contained in the medium 99 after being subjected to processing by the heating units 73.

With the first electrostatic capacitance sensor 27 and the second electrostatic capacitance sensor 28, change in amount of moisture contained in the medium 99 with respect to processing to which the medium 99 is subjected by the processing unit is detected. Specifically, decrease in amount of moisture contained in the medium 99 with respect to heating to which the medium 99 is subjected by the heating units 73 is detected. Specifically, in the second exemplary embodiment, decrease in amount of moisture contained in the medium 99 with respect to heating to which the medium 99 is subjected by the heating units 73 is calculated.

The optical sensor 29 of the second exemplary embodiment is positioned downstream of the heating units 73 in the transport direction Y. The optical sensor 29 of the second exemplary embodiment is positioned downstream of the accommodation body 72 in the transport direction Y. The optical sensor 29 of the second exemplary embodiment is positioned upstream of the second electrostatic capacitance sensor 28 in the transport direction Y. The optical sensor 29 faces the second support unit 71. The optical sensor 29 is positioned above the second support unit 71.

The optical sensor 29 detects an amount of moisture contained in the medium 99 after being heated by the heating units 73. Specifically, the optical sensor 29 detects an amount of moisture contained in the medium 99 after being subjected to processing by the heating units 73. Thus, the light source 62 irradiates the medium 99 after being heated by the heating units 73 with light. The light receiving unit 63 receives light reflected by the medium 99 after being heated by the heating units 73.

When the heating units 73 heats the medium 99, the front surface 99A is dried. However, the inner part of the medium 99 is not dried in some cases. In this case, with reference to a detection result of the first electrostatic capacitance sensor 27 and a detection result of the second electrostatic capacitance sensor 28, it can be grasped that decrease in amount of moisture contained in the medium 99 is less than a heat amount supplied to the medium 99 by the heating units 73. Meanwhile, with reference to a detection result of the first electrostatic capacitance sensor 27 and a detection result of the optical sensor 29, decrease in amount of moisture contained in the medium 99 is more than a heat amount supplied to the medium 99 by the heating units 73. Based on the matters described above, it can be grasped that the medium 99 has characteristics of being less likely to be dried. In this manner, based on a detection result of the first electrostatic capacitance sensor 27, a detection result of the second electrostatic capacitance sensor 28, and a detection result of the optical sensor 29, characteristics of the medium 99 can be grasped.

According to the second exemplary embodiment described above, the following effects can be obtained in addition to the effects similar to those in the first exemplary embodiment.

(7) The detection device 24 includes the second reception unit 38 that receives an ultrasonic wave reflected by the medium 99 supported by the second support unit 71 and an ultrasonic wave reflected by the second support unit 71. According to this, based on an ultrasonic wave that is reflected by the medium 99 supported by the second support unit 71 and an ultrasonic wave that is reflected by the second support unit 71, a thickness of the medium 99 can be detected.

(8) The first electrostatic capacitance sensor 27 includes the first position adjustment unit 43. According to this, when a position of the first electrode pair 42 with respect to the second support unit 71 is adjusted, the first electrode pair 42 can be effectively brought into contact with the medium 99. Further, the second electrostatic capacitance sensor 28 includes the second position adjustment unit 53. According to this, when a position of the second electrode pair 52 with respect to the second support unit 71 is adjusted, the second electrode pair 52 can be effectively brought into contact with the medium 99.

The first exemplary embodiment and the second exemplary embodiment described above may be modified and carried out as described below. The first embodiment, the second embodiment, and the modified examples below may be implemented in combination within a range in which a technical contradiction does not arise.

In place of the first attachment hole 31, a recess may be provided in the support unit.

In place of the second attachment hole 32, a recess may be provided in the support unit.

The first transmission unit 35 may constitute both the first ultrasonic wave sensor 25 and the second ultrasonic wave sensor 26. Specifically, the first transmission unit 35 may function as the second transmission unit 37. In this case, for example, the first transmission unit 35 moves in the transport direction Y and the opposite direction. With this, the first transmission unit 35 can transmit an ultrasonic wave to the first reception unit 36, and can transmit an ultrasonic wave to the support unit. The second reception unit 38 receives an ultrasonic wave that is transmitted from the first transmission unit 35 and is reflected by the medium 99 or the support unit.

In the second exemplary embodiment, the first ultrasonic wave sensor 25 and the second ultrasonic wave sensor 26 may be positioned at the positions similar to those in the first exemplary embodiment. When the medium 99 before the liquid is ejected thereonto is irradiated with an ultrasonic wave, a basis weight of the medium 99 and a thickness of the medium 99 can be detected at higher accuracy, as compared to a case where the medium 99 after the liquid is ejected thereonto is irradiated with an ultrasonic wave.

The first position adjustment unit 43 may be electrically driven to be capable of adjusting a position of the first electrode pair 42. For example, the first position adjustment unit 43 may be an actuator.

The first position adjustment unit 43 may be configured to be capable of adjusting a position of the first electrode pair 42 with respect to the first retaining unit 41. In this case, a position of the first electrode pair 42 is also adjusted with respect to the support unit. Further, in this case, the first position adjustment unit 43 may be configured to be capable of adjusting positions of the two first electrodes 44 independently.

The second position adjustment unit 53 may be electrically driven to be capable of adjusting a position of the second electrode pair 52. For example, the second position adjustment unit 53 may be an actuator.

The second position adjustment unit 53 may be configured to be capable of adjusting a position of the second electrode pair 52 with respect to the second retaining unit 51. In this case, a position of the second electrode pair 52 is also adjusted with respect to the support unit. Further, in this case, the second position adjustment unit 53 may be configured to be capable of adjusting positions of the two second electrodes 54 independently.

In the second exemplary embodiment, the optical sensor 29 may be positioned upstream of the heating units 73 in the transport direction Y. In this case, the optical sensor 29 may be positioned upstream of the accommodation body 72 in the transport direction Y. With this, heat of the heating units 73 is less likely to reaches the optical sensor 29.

In the second exemplary embodiment, the optical sensor 29 may be positioned between the printing device 14 and the accommodation body 72 in the transport direction Y. In this case, the optical sensor 29 detects an amount of moisture contained in the medium 99 before being heated by the heating units 73. Specifically, the optical sensor 29 detects an amount of moisture contained in the medium 99 before being subjected to processing by the heating units 73. More specifically, the optical sensor 29 detects an amount of moisture contained in the medium 99 after the liquid is ejected thereonto.

The light shielding unit 64 may be configured to shield the detection optical path L1 by closing the opening 65. For example, the light shielding unit 64 may reflect light emitted from the light source 62, and thus may cause the light to enter the light receiving unit 63. In this case, the light shielding unit 64 may not have the hole 69.

The first state S1 may be a state in which an amount of light passing through the detection optical path L1 is larger than an amount of light passing through the reference optical path L2. In this case, the light shielding unit 64 in the first state S1 shields light advancing through the reference optical path L2 more than light advancing through the detection optical path L1.

The second state S2 may be a state in which an amount of light passing through the reference optical path L2 is larger than an amount of light passing through the detection optical path L1. In this case, the light shielding unit 64 in the second state S2 shields light advancing through the detection optical path L1 more than light advancing through the reference optical path L2.

The light source 62 may be configured to emit light having a wavelength that is likely to be absorbed in water and a wavelength that is less likely to be absorbed in water. In this case, of light reflected by the medium 99, intensity of light having a wavelength that is likely to be absorbed in water and intensity of light having a wavelength that is less likely to be absorbed in water are compared. With this, reflectance of light with respect to the medium 99 can be calculated. With this, without causing the light to directly enter the light receiving unit 63 from the light source 62, reflectance of light with respect to the medium 99 can be calculated.

The light source 62 may only include the first light emitting element 66, or may only include the second light emitting element 67. Specifically, the light source 62 may only include a short-wavelength light emitting element that emits light having a peak wavelength of 940 nm, or may only include a long-wavelength light emitting element that emits light having a peak wavelength of 1,450 nm.

The drying device 15 may include an air blowing unit that blows air to the medium 99, in place of the heating units 73. In this case, the air blowing unit corresponds to a processing unit. Drying of the medium 99 is promoted by blowing air to the medium 99.

The drying device 15 may include an air blowing unit that blows air to the medium 99, in addition to the heating units 73. In this case, the heating units 73 and the air blowing unit correspond to processing units. Drying of the medium 99 is promoted more by blowing air to the medium 99 in addition to heating the medium 99.

The detection device 24 is only required to include the first ultrasonic wave sensor 25 and any one electrostatic capacitance sensor of the first electrostatic capacitance sensor 27 and the second electrostatic capacitance sensor 28. Even in a configuration of including any one of the first electrostatic capacitance sensor 27 and the second electrostatic capacitance sensor 28, an amount of moisture contained in the medium 99 can be detected. In a configuration of including both the first electrostatic capacitance sensor 27 and the second electrostatic capacitance sensor 28, change in amount of moisture contained in the medium 99 can be detected.

Hereinafter, technical concepts and effects thereof that are understood from the above-described exemplary embodiments and modified examples are described.

(A) A detection device includes an electrostatic capacitance sensor including an electrode pair and being configured to detect electrostatic capacitance of a medium brought into contact with the electrode pair, and an ultrasonic wave sensor including a transmission unit configured to transmit an ultrasonic wave and a reception unit configured to receive an ultrasonic wave transmitted from the transmission unit, wherein the transmission unit and the reception unit are positioned to sandwich the medium.

When the medium is present between the transmission unit and the reception unit, an ultrasonic wave transmitted from the transmission unit passes through the medium. In this case, the reception unit receives an ultrasonic wave passing through the medium. When the medium is not present between the transmission unit and the reception unit, the reception unit receives an ultrasonic wave transmitted from the transmission unit as it is. Based on an ultrasonic wave that does not pass through the medium and an ultrasonic wave that passes through the medium, transmittance of an ultrasonic wave with respect to the medium is detected. Based on transmittance of an ultrasonic wave with respect to the medium, a basis weight of the medium is detected. Thus, according to the configuration described above, based on electrostatic capacitance of the medium, which is detected by the electrostatic capacitance sensor, and a basis weight of the medium, which is detected by the ultrasonic wave sensor, an amount of moisture contained in the medium can be detected.

(B) The detection device described above may be a detection device configured to detect an amount of moisture contained in the medium supported by a support unit, wherein the reception unit may be a first reception unit, and the detection device may include a second reception unit configured to receive an ultrasonic wave that is reflected by the medium supported by the support unit and an ultrasonic wave that is reflected by the support unit.

According to the configuration described above, based on an ultrasonic wave that is reflected by the medium supported by the support unit and an ultrasonic wave that is reflected by the support unit, a thickness of the medium can be detected.

(C) The detection device described above may be a detection device configured to detect an amount of moisture contained in the medium supported by a support unit, wherein the electrostatic capacitance sensor may be attached to the support unit, and a position adjustment unit may be provided, the position adjustment unit configured to adjust a position of the electrode pair with respect to the support unit.

According to the configuration described above, when a position of the electrode pair with respect to the support unit is adjusted, the electrode pair can be effectively brought into contact with the medium.

(D) In the detection device described above, the electrode pair may include two electrodes, and the position adjustment unit may adjust a position of the electrode pair in a state in which a distance between the two electrodes is maintained.

According to the configuration described above, even when a position of the electrode pair is adjusted, electrostatic capacitance of the medium can be detected at high accuracy.

(E) A processing device includes a first electrostatic capacitance sensor including a first electrode pair and being configured to detect electrostatic capacitance of a medium brought into contact with the first electrode pair, a second electrostatic capacitance sensor including a second electrode pair and being configured to detect electrostatic capacitance of the medium brought into contact with the second electrode pair, an ultrasonic wave sensor including a transmission unit configured to transmit an ultrasonic wave and a reception unit configured to receive an ultrasonic wave transmitted from the transmission unit, a support unit configured to support the medium to be transported, and a processing unit facing the support unit and being configured to perform processing of increasing or decreasing an amount of moisture contained in the medium, wherein the transmission unit and the reception unit are positioned to sandwich the medium to be transported, the first electrode pair is brought into contact with the medium before being subjected to processing by the processing unit, and the second electrode pair is brought into contact with the medium after being subjected to processing by the processing unit.

According to the configuration described above, the first electrostatic capacitance sensor and the ultrasonic wave sensor detect an amount of moisture contained in the medium before being subjected to processing. The second electrostatic capacitance sensor and the ultrasonic wave sensor detect an amount of moisture contained in the medium after being subjected to processing. With this, decrease in amount of moisture contained in the medium with respect to processing or increase in amount of moisture contained in the medium with respect to processing can be detected. Therefore, an amount of moisture contained in the medium can be detected at high accuracy.

(F) In the processing device described above, the processing unit may be configured to perform processing on a front surface of the medium, the surface being opposite to a back surface contacting the support unit, and the first electrode pair and the second electrode pair may contact the back surface.

According to the configuration described above, as compared to a case where the electrode pair is brought into contact with the front surface of the medium, a risk of damaging the front surface to be subjected to processing is reduced.

What is claimed is:

1. A detection device, comprising:
   an electrostatic capacitance sensor including an electrode pair and being configured to detect electrostatic capacitance of a medium in contact with the electrode pair; and
   an ultrasonic wave sensor including a transmission unit configured to transmit an ultrasonic wave and a reception unit configured to receive an ultrasonic wave transmitted from the transmission unit, wherein
   the transmission unit and the reception unit are positioned to sandwich the medium.

2. The detection device according to claim 1, wherein the detection device is configured to detect an amount of moisture contained in the medium supported by a support unit,
   the reception unit is a first reception unit, and
   the detection device includes a second reception unit configured to receive an ultrasonic wave that is reflected by the medium supported by the support unit and an ultrasonic wave that is reflected by the support unit.

3. The detection device according to claim 1, wherein the detection device is configured to detect an amount of moisture contained in the medium supported by a support unit, the electrostatic capacitance sensor is attached to the support unit, and includes a position adjustment unit configured to adjust a position of the electrode pair with respect to the support unit.

4. The detection device according to claim 3, wherein
the electrode pair includes two electrodes, and
the position adjustment unit adjusts a position of the electrode pair in a state in which a distance between the two electrodes is maintained.

5. A processing device, comprising:
a first electrostatic capacitance sensor including a first electrode pair and being configured to detect electrostatic capacitance of a medium in contact with the first electrode pair;
a second electrostatic capacitance sensor including a second electrode pair and being configured to detect electrostatic capacitance of the medium in contact with the second electrode pair;
an ultrasonic wave sensor including a transmission unit configured to transmit an ultrasonic wave and a reception unit configured to receive an ultrasonic wave transmitted from the transmission unit;
a support unit configured to support the medium to be transported; and
a processing unit facing the support unit and being configured to perform processing of increasing or decreasing an amount of moisture contained in the medium, wherein
the transmission unit and the reception unit are positioned to sandwich the medium to be transported,
the first electrode pair contacts the medium before being subjected to processing by the processing unit, and
the second electrode pair contacts the medium after being subjected to processing by the processing unit.

6. The processing device according to claim 5, wherein
the processing unit is configured to perform processing on a front surface of the medium, the front surface being opposite to a back surface contacting the support unit, and
the first electrode pair and the second electrode pair contact the back surface.

* * * * *